May 20, 1924.
M. NELSON
PIECE GOODS REEL
Filed Nov. 20 1922
1,494,619
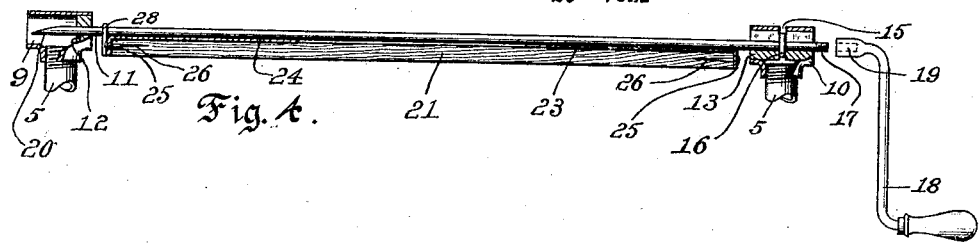
Fig. 4.
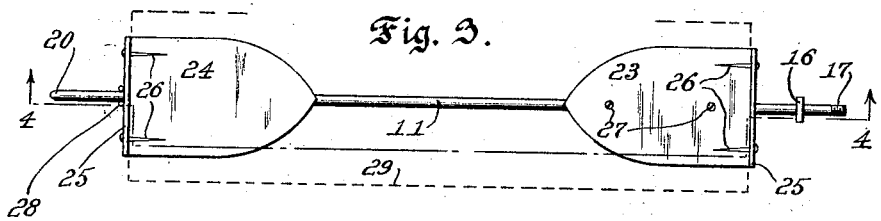
Fig. 3.
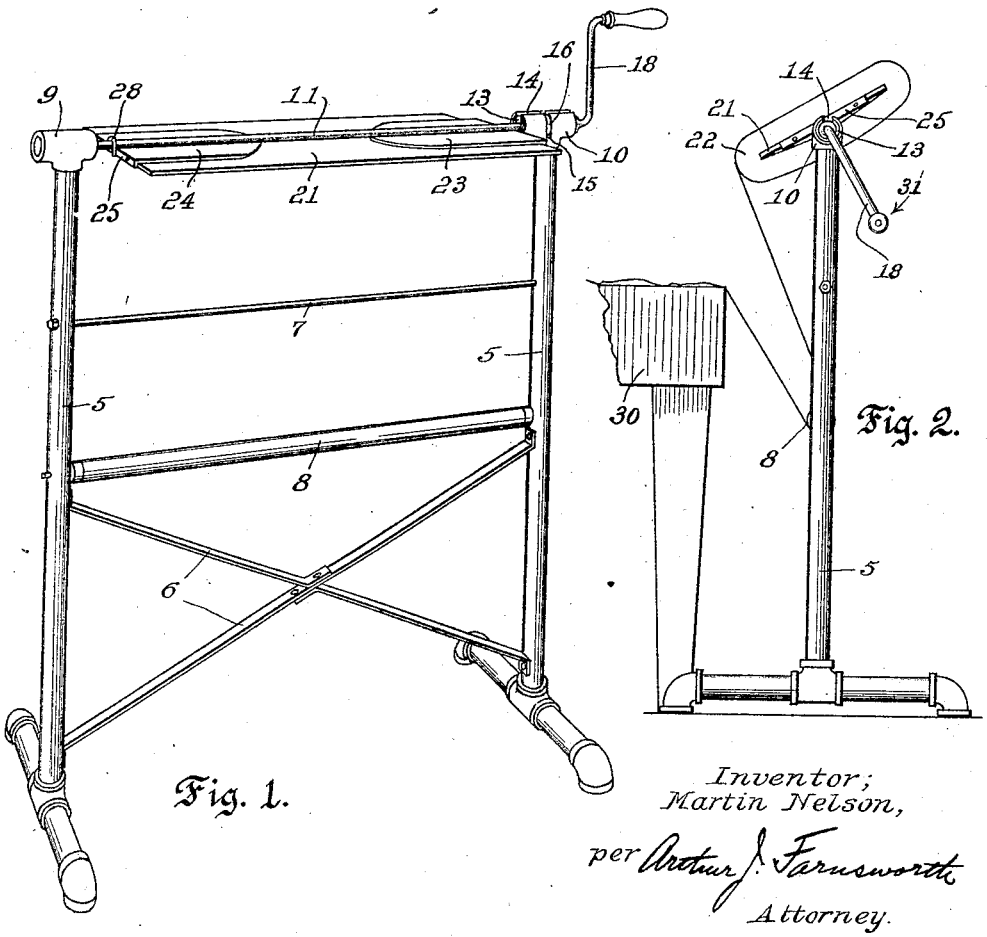
Fig. 1.
Fig. 2.
Inventor;
Martin Nelson,
per Arthur J. Farnsworth
Attorney.

Patented May 20, 1924.

1,494,619

UNITED STATES PATENT OFFICE.

MARTIN NELSON, OF LOS ANGELES, CALIFORNIA.

PIECE-GOODS REEL.

Application filed November 20, 1922. Serial No. 602,184.

*To all whom it may concern:*

Be it known that I, MARTIN NELSON, a citizen of the United States, residing at Los Angeles, in the county of Los Angeles and State of California, have invented a new and useful Piece-Goods Reel, of which the following is a specification.

The invention relates to improvements in reels for handling bolts of textile materials, and the like, for un-rolling and re-winding; and the objects of the improvement are, first, to furnish convenient means for securely attaching an arbor to the core board of a full bolt of cloth; second, to provide facilities for quickly mounting this arbor with its attached bolt, in bearings for rotation; third, to supply a guiding device which will insure that the cloth is fed to the reel straight and flat during rewinding; and, fourth, to accomplish the above in a machine of great simplicity and which is relatively inexpensive to construct.

Other objects and advantages will appear hereinafter, and while I show herewith and will describe a preferred form of construction, I desire to be understood that I do not limit myself to such form, since various changes and adaptations may be made therein without departing from the spirit of my invention as hereinafter claimed.

My objects are attained by the device illustrated in the accompanying drawing, in which Figure 1 is a perspective view of the entire machine by itself; Fig. 2 is an end elevation of the machine with a bolt of cloth thereon, and set up for use with a bench or counter; Fig. 3 is a plan view of the arbor and co-operating attachments; and Fig. 4 is a vertical fragmentary section taken on the line 4—4 of Fig. 3.

Similar numerals refer to similar parts throughout the several views.

For illustrative purposes I have shown the frame as constructed of pipe and pipe fittings comprising the vertical standards 5, suitably braced and connected by the diagonals 6 and spacing rod 7. A freely turning horizontal roller 8 is journalled in the standards about half way up, and T fittings 9 and 10 respectively are provided at the tops of the standards to serve as bearings for the horizontal arbor 11.

Bearing 9 is bushed at its inner end only, as at 12. Bearing 10 has a fixed bushing throughout its horizontal length, as at 13, and has a longitudinal slot 14, and a transverse slot 15, cut through the T bearing and into itself.

The arbor 11 is provided with an integral thrust collar 16 near one end, and this end is threaded at 17 for attaching the operating handle 18. The socket of this handle is correspondingly tapped as indicated in Fig. 4 at 19. The opposite end of the arbor is spade pointed as shown at 20 in Figs. 3 and 4.

For attaching the core 21 of the cloth bolt 22 to the arbor, I provide two blunt pointed spade shaped plates 23 and 24 respectively. Both plates have transverse flanges 25 turned thereon, and two or more points 26 projecting inwardly from the flanges, parallel to the plates.

Plate 23 is permanently attached to the arbor in any convenient manner, as by the screws 27, while plate 24 is provided with a loop or eye 28, by means of which it may be attached to the arbor. This plate is positioned and held in proper relation to the other parts in a manner to be explained presently.

When it is desired to mount a bolt of cloth on my machine, the detached arbor 11 is inserted longitudinally in the bolt between the cloth and the core board. The object of spade pointing the arbor is now seen to be to make this operation easier by preventing the point from catching on the inner layer of cloth. When fully inserted, the points of plate 23 are pressed into the end of the core board. Plate 24 then has its loop passed over the end of the arbor, and is inserted in a similar manner at the other end of the bolt, its points being pressed into that end of the core board. When the bolt is thus attached, the point of the arbor is passed through bushing 12 and the other end is dropped into slot 14 with the thrust collar positioned by transverse slot 15. The handle 18 is next attached, and the machine is ready to be operated.

In Fig. 3 the dotted line 29 shows in plan the position the core board assumes with relation to the other parts. Although plate 24 is loose on the arbor, its position is fixed when the core board is added. The latter, at the same time, is held in its proper cooperative relation to the other parts by the plate flanges and their points.

For clearness of illustration, plates 23 and 24 are shown as having considerable thickness. As actually constructed these plates are preferably made of thin sheet steel, with rounded smooth edges to prevent catching on the cloth when inserted in the bolt.

For re-winding a bolt I prefer to use a table or counter 30, and to place my machine at the end thereof, as shown in Fig. 2. The cloth is drawn over the edge of the counter, and under roller 8 before being reeled on the bolt. Wrinkles and creases in the goods are smoothed out, and the bolt is wound evenly in this manner. The operating handle during this process, of course, is turned clockwise as indicated by arrow 31.

I desire especially to point out that this invention is adapted to handle bolts of much variation in size and shape, and that it will save a great amount of time in comparison with hand unrolling and re-winding of bolts. Also that its construction is of great simplicity and is relatively inexpensive. Furthermore my reel may be designed for floor use as illustrated, or for use directly upon a counter as a permanent fixture.

Having thus fully described my invention, I claim:

1. In a piece goods reel; a removable arbor having a flattened end adapted for insertion in a cloth bolt, a detachable crank, and a collar for maintaining its longitudinal position during rotation; and a pair of plates adapted for similar insertion having prongs for engaging the ends of the core of said bolt for rotation; one of said plates being affixed to said arbor and the other being longitudinally slidable thereon; substantially as described.

2. In a piece goods reel; a removable arbor having a flattened end adapted for insertion in a cloth bolt, a detachable crank, and a collar for maintaining its longitudinal position during rotation; and a pair of plates adapted for similar insertion having transverse flanges with prongs parallel to the arbor for engaging the ends of the core of said bolt for rotation; one of said plates being affixed to said arbor and the other being longitudinally slidable thereon; substantially as described.

3. A piece goods reel comprising a stand with a closed and an open top journal bearing; a removable arbor having a flattened end adapted for insertion in a bolt of cloth between the fabric and the core; a pair of plates adapted for similar insertion having flanges transverse to said arbor and prongs parallel thereto for engaging the ends of said core; and means for revolving said arbor in fixed longitudinal position in said bearings; one of said plates being affixed to said arbor and the other being longitudinally slidable thereon.

MARTIN NELSON.